US012420646B2

(12) United States Patent
Yasuda et al.

(10) Patent No.: US 12,420,646 B2
(45) Date of Patent: Sep. 23, 2025

(54) MOTOR CONTROL DEVICE AND MOTOR CONTROL METHOD

(71) Applicants: TOYOTA JIDOSHA KABUSHIKI KAISHA, Toyota (JP); DENSO CORPORATION, Kariya (JP)

(72) Inventors: Satoshi Yasuda, Nagakute (JP); Taro Shimosaka, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 192 days.

(21) Appl. No.: 18/286,908

(22) PCT Filed: Mar. 31, 2022

(86) PCT No.: PCT/IB2022/053020
§ 371 (c)(1),
(2) Date: Oct. 13, 2023

(87) PCT Pub. No.: WO2022/219444
PCT Pub. Date: Oct. 20, 2022

(65) Prior Publication Data
US 2024/0190261 A1  Jun. 13, 2024

(30) Foreign Application Priority Data
Apr. 14, 2021  (JP) .................. 2021-068350

(51) Int. Cl.
*G06F 17/00* (2019.01)
*B60L 3/00* (2019.01)
*B60L 15/20* (2006.01)

(52) U.S. Cl.
CPC ............ *B60L 15/20* (2013.01); *B60L 3/0084* (2013.01); *B60L 2240/421* (2013.01); *B60L 2240/423* (2013.01); *B60L 2240/486* (2013.01)

(58) Field of Classification Search
CPC .. B60L 15/20; B60L 3/0084; B60L 2240/421; B60L 2240/423;
(Continued)

(56) References Cited

U.S. PATENT DOCUMENTS 11,063,548 B2 * 7/2021 Cox .......................... H02J 7/36
11,387,760 B2 * 7/2022 Iwai ........................ H02P 21/22
(Continued)

FOREIGN PATENT DOCUMENTS

| AU | 2012278980 A1 | * | 1/2014 | ............ B60L 3/0061 |
| EP | 3923464 A1 | * | 12/2001 | .............. H02P 25/08 |
| EP | 2093098 B1 | * | 5/2010 | .............. H02P 25/03 |
| EP | 4009515 A1 | * | 6/2022 | .............. H02P 25/22 |
| JP | 2001329884 A | * | 11/2001 | ............ B60W 10/08 |
| JP | 2003204606 A | * | 7/2003 | ............ B60L 3/0092 |

(Continued)

OTHER PUBLICATIONS

Fault Detection and Diagnosis of the Electric Motor Drive (Year: 2023).*

*Primary Examiner* — Ronnie M Mancho
(74) *Attorney, Agent, or Firm* — Oliff PLC (57) ABSTRACT

A motor control device includes: a first storage unit that stores characteristic data related to drive control of a vehicle motor; a second storage unit that stores a vehicle type parameter related to a predetermined vehicle type; a processor that executes arithmetic processing related to the drive control corresponding to the predetermined vehicle type, based on the vehicle type parameter and the characteristic data; and a drive circuit that executes drive processing of a vehicle motor of the predetermined vehicle type, based on a result of the arithmetic processing, in which the drive circuit reads out the characteristic data from the first storage unit and the vehicle type parameter from the second storage unit when abnormality has occurred in the processor, and to execute the arithmetic processing related to the drive
(Continued)

control corresponding to the predetermined vehicle type, based on the vehicle type parameter and the characteristic data.

7 Claims, 7 Drawing Sheets

(58) Field of Classification Search
CPC ............ B60L 2240/486; B60L 3/0092; B60W 2050/0026; B60W 2050/0292; B60W 2510/081; B60W 2510/083; B60W 2710/08; B60W 10/08; B60W 50/023; B60W 50/029
USPC .......................................................... 701/22
See application file for complete search history.

(56) References Cited

U.S. PATENT DOCUMENTS

| | | | |
|---|---|---|---|
| 2009/0212728 A1* | 8/2009 | Yagi | ..................... B62M 7/12 |
| | | | 310/209 |
| 2012/0191282 A1 | 7/2012 | Maki | |
| 2013/0116876 A1 | 5/2013 | Park | |
| 2016/0373051 A1 | 12/2016 | Kudanowski | |
| 2020/0162011 A1* | 5/2020 | Cox | ................. H01M 10/0445 |

FOREIGN PATENT DOCUMENTS

| | | | |
|---|---|---|---|
| JP | 2011-063038 A | 3/2011 | |
| JP | 5333419 B2 * | 11/2013 | ........... H02K 19/103 |
| JP | 2018-109551 A | 7/2018 | |
| JP | 6777623 B2 | 10/2020 | |

\* cited by examiner

MOTOR CONTROL DEVICE AND MOTOR CONTROL METHOD

BACKGROUND OF THE INVENTION

1. Field of the Invention

The present invention relates to a motor control device and a motor control method.

2. Description of Related Art

For example, an electrified vehicle such as a hybrid vehicle and an electric vehicle is provided with a plurality of motors such as a motor for driving front wheels or rear wheels and a motor for generating power. A control device of each motor executes control processing by distributing the load for each motor by, for example, a plurality of microcontrollers having a built-in processor such as a central processing unit (CPU) (for example, Japanese Unexamined Patent Application Publication No. 2018-109951 (JP 2018-109951 A)).

One microcontroller executes, when abnormality has occurred in the other microcontroller, the control processing on behalf of the other microcontroller to operate the motor normally. With this, a fail-safe function is realized.

Document JP 6 777623 B2 discloses a running command correction device of a work vehicle.

US 2016/0373081 A1 discloses a motor bridge driver integrated circuit.

US 2013/0116876 A1 discloses ar ic V a method for rolling an icy thereof.

SUMMARY OF THE INVENTION

When the control processing of the plurality of motors is integrated into one microcontroller, the load of the control processing of the processor built in the microcontroller increases. Therefore, it is conceivable that a part of the control processing is shared with, for example, an application specific integrated circuit (ASIC). In this case, the ASIC realizes the fail-safe function by executing the control processing of the microcontroller when abnormality has occurred in the microcontroller.

In addition, in order to make it possible to mount the microcontroller on a plurality of vehicle types of vehicles, the microcontroller executes control processing by switching, using software, characteristic data related to motor drive control in response to a vehicle type of a vehicle that is a mounting target. However, in order to reduce the device cost, the ASIC does not have a built-in memory that stores characteristic data corresponding to the plurality of vehicle types in advance, so that the ASIC can execute solely control processing in accordance with the characteristics of a specific vehicle type.

Therefore, in a case where the ASIC is used for a vehicle of a vehicle type that the ASIC does not support, the control device cannot normally drive and control the motor in accordance with the characteristics corresponding to the vehicle type of the vehicle on which the control device is mounted when abnormality has occurred in the microcontroller, so that the fail-safe function cannot be appropriately realized.

In that regard, the present invention provides a motor control device capable of restraining an increase in device cost and appropriately realizing a fail-safe function in response to a vehicle type.

A first aspect of the invention relates to a motor control device including a first storage unit, a second storage unit, a processor, and a drive circuit. The first storage unit is configured to store characteristic data related to drive control of a motor of a vehicle. The second storage unit is configured to store a vehicle type parameter related to a predetermined vehicle type. The processor is configured to execute arithmetic processing related to the drive control corresponding to the predetermined vehicle type, based on the vehicle type parameter and the characteristic data. The drive circuit is configured to execute a drive processing of a motor of a vehicle of the predetermined vehicle type, based on a result of the arithmetic processing. The drive circuit is configured to read out the characteristic data from the first storage unit and the vehicle type parameter from the second storage unit when abnormality has occurred in the processor, and to execute the arithmetic processing related to the drive control corresponding to the predetermined vehicle type, based on the vehicle type parameter and the characteristic data.

In the motor control device according to the first aspect, the first storage unit may be configured to store the characteristic data corresponding to the other vehicle type different from the predetermined vehicle type. The drive circuit may be configured to correct the characteristic data such that the characteristic data corresponds to the predetermined vehicle type, based on the vehicle type parameter, when abnormality has occurred in the processor and to use the corrected characteristic data for the arithmetic processing.

In the motor control device according to the first aspect, the first storage unit may be configured to store the characteristic data corresponding to a plurality of vehicle types. The drive circuit may be configured to read out, from the first storage unit, the characteristic data corresponding to the predetermined vehicle type out of the plurality of vehicle types based on the vehicle type parameter, and to use the characteristic data for the arithmetic processing.

In the motor control device according to the first aspect, the characteristic data may include a correlation between rotation speed and torque of the motor.

In the motor control device according to the first aspect, the characteristic data may include a correlation between torque and a current value of the motor.

In the motor control device according to the first aspect, the vehicle type parameter may be a reduction ratio of a differential gear connected to the motor.

In the motor control device according to the first aspect, the drive circuit may be configured to receive notification regarding normality of the processor. The drive circuit may be configured to determine whether or not abnormality has occurred in the processor, based on the notification.

A second aspect of the invention relates to a motor control method. The motor control method includes determining, by a drive circuit, whether or not abnormality has occurred in a processor configured to execute arithmetic processing related to drive control corresponding to a predetermined vehicle type, based on a vehicle type parameter related to drive control of a motor of a vehicle and characteristic data related to the predetermined vehicle type; reading out, by the drive circuit, the characteristic data from a first storage unit configured to store the characteristic data and the vehicle type parameter from a second storage unit configured to store the vehicle type parameter when the drive circuit determines that abnormality has occurred in the processor; and executing, by the drive circuit, the arithmetic processing related to the drive control corresponding to the predetermined vehicle type, based on the vehicle type parameter and the characteristic data.

According to the above-described aspects of the present invention, it is possible to restrain an increase in device cost and appropriately realize a fail-safe function in response to a vehicle type.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Configuration Example of Motor Control Device

Figure 1:
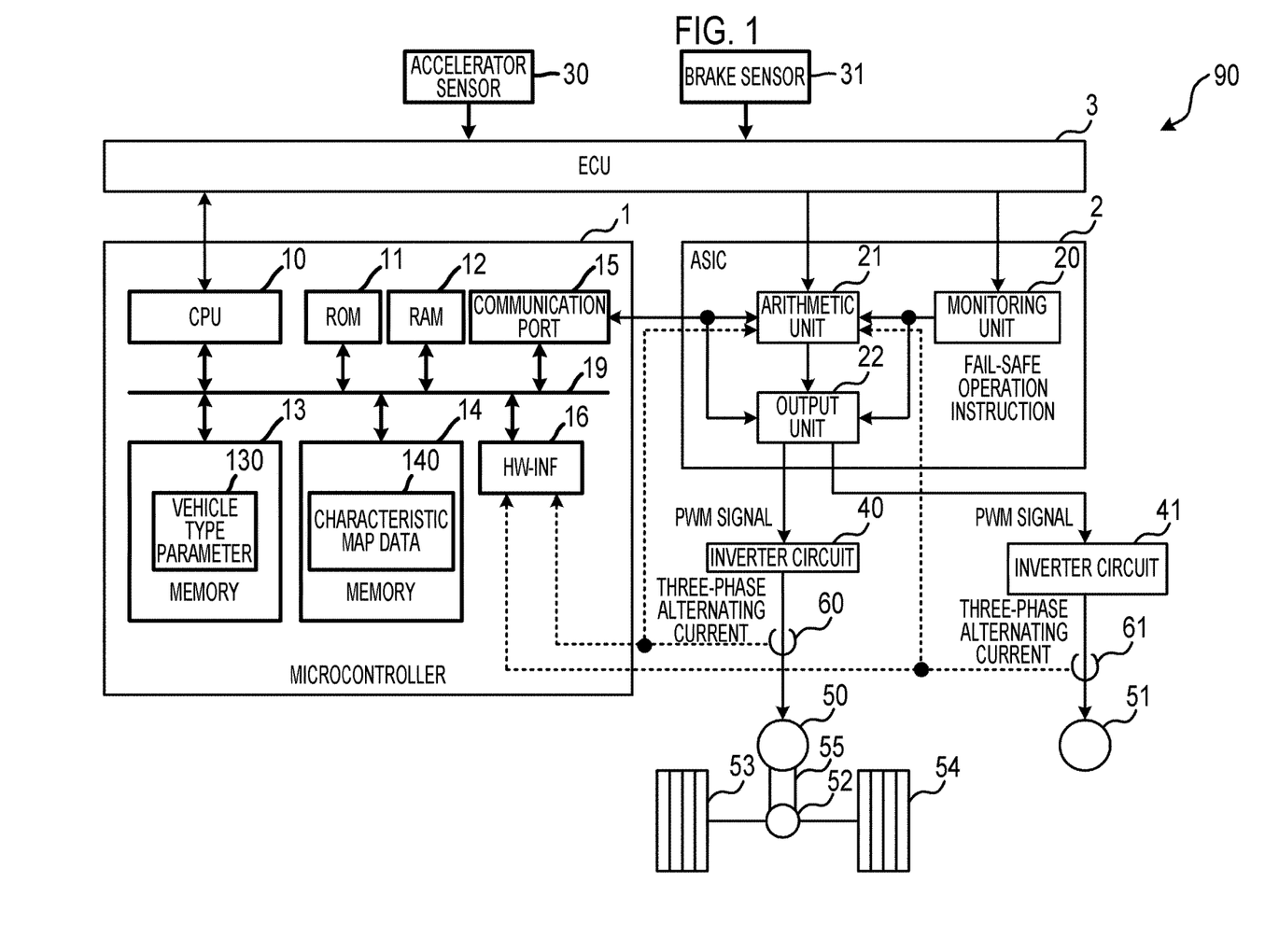
FIG. 1 is a configuration diagram showing an example of a motor control device.

FIG. 1 is a configuration diagram showing an example of a motor control device 90. The motor control device 90 includes a microcontroller 1, an ASIC 2, an electronic control unit (ECU) 3, an accelerator sensor 30, and a brake sensor 31, and is mounted on an electrified vehicle such as a hybrid vehicle or an electric vehicle (hereinafter, referred to as a "vehicle").

The motor control device 90 controls inverter circuits 40, 41 connected to motors 50, 51, respectively. Each of the inverter circuits 40, 41 has, for example, a plurality of insulated gate bipolar transistors (IGBTs) corresponding to three-phase upper and lower arms. On/off control is performed for each IGBT by a pulse width modulation (PWM) signal received from ASIC 2 as an input.

The inverter circuits 40, 41 generate three-phase alternating current in accordance with the PWM signals and output the three-phase alternating current to the motors 50, 51, respectively. The inverter circuits 40, 41 may have other types of transistors instead of the IGBT.

The motors 50, 51 are driven by three-phase alternating current in accordance with the control of the motor control device 90. Current sensors 60, 61 that detect the current value of each phase of the three-phase alternating current are provided between the inverter circuits 40, 41 and the motors 50, 51, respectively. The current sensors 60, 61 notify the microcontroller 1 and the ASIC 2 of the current value.

The motor 50 is used to drive the wheels (front wheels or rear wheels) 53, 54 of the vehicle, as an example. The motor 50 is connected to a differential gear 52 via a drive shaft 55. The differential gear 52 transmits the torque of the motor 50 to the wheels 53, 54 as a driving force corresponding to the reduction ratio unique to the vehicle type of the vehicle. In addition, the motor 51 is used, for example, to generate power. Note that the number of motors mounted on the vehicle is not limited.

The accelerator sensor 30 detects the operation amount of an accelerator pedal of the vehicle and outputs the detected value to the ECU 3. The brake sensor 31 detects the operation amount of a brake pedal of the vehicle and outputs the detected value to the ECU 3.

The ECU 3 is a computer device that generally controls the vehicle. The ECU 3 calculates the driving force requested for the vehicle (hereinafter, referred to as a "requested driving force") from the operation amount of the accelerator pedal, the operation amount of the brake pedal, and the like. The ECU 3 notifies the microcontroller 1 of the requested driving force.

The microcontroller 1 has a CPU 10 that is an example of the processor, a read only memory (ROM) 11, a random access memory (RAM) 12, memories 13, 14, a communication port 15, and a hardware interface unit (HW-INF) 16. The CPU 10 is electrically connected to the ROM 11, the RAM 12, the memories 13, 14, the communication port 15, and the HW-INF 16 via a bus 19 such that signals can be input to and output from each other.

The ROM 11 stores a program by which the CPU 10 is driven. The RAM 12 functions as a working memory of the CPU 10. The communication port 15 is used to communicate with the ASIC 2. The HW-INF 16 receives the current values of the three-phase alternating current from the current sensors 60, 61. The HW-INF 16 notifies the ASIC 2 of the current value via the CPU 10 or the communication port 15.

The memory 13 is an example of the second storage unit, and stores a parameter (hereinafter, referred to as a "vehicle type parameter") 130 related to the vehicle type of the vehicle on which the motor control device 90 is mounted. Examples of the vehicle type parameter 130 include the reduction ratio of the differential gear 52 connected to the motor 50, or a value related to the output performance of the motors 50, 51. As described above, the vehicle type parameter 130 is a parameter related to the specification unique to the vehicle type of the vehicle on which the motor control device 90 is mounted.

The memory 14 is an example of the first storage unit, and stores characteristic map data 140 related to the drive control of each of the motors 50, 51. The characteristic map data 140 is an example of the characteristic data. The characteristic map data 140 includes, for example, rotation speed-torque map data indicating a correlation between the rotation speed and torque requested for the motors 50, 51 (hereinafter, referred to as "requested rotation speed" and "requested torque", respectively), and torque-current map data indicating a correlation between the requested torque and current command value of the three-phase current.

The memories 13, 14 are non-volatile memories such as a flash memory. At the time of manufacturing the motor control device 90, the vehicle type parameter 130 that is decided by the vehicle type of the vehicle that is a mounting target of the motor control device 90 is written in the memory 13, and the characteristic map data 140 corresponding to one or more vehicle types is written in the memory 14.

The CPU 10 reads a program from the ROM 11 and is operated in accordance with the program. The CPU 10 receives the requested driving force from the ECU 3, and executes arithmetic processing related to the drive control of the motors 50, 51 corresponding to the type of the vehicle on which the motor control device 90 is mounted based on the vehicle type parameter 130 and the characteristic map data 140 such that the requested driving force is satisfied.

In the arithmetic processing, the CPU 10 calculates the current command value of each of the motors 50, 51 based on the vehicle type parameter 130 and the characteristic map data 140 from the requested driving force, and calculates the voltage command value of each of the motors 50, 51 from the current command values and the current values acquired from the current sensors 60, 61. Further, the CPU 10 calculates on/off timing (hereinafter, referred to as "on/off timing") that decides the duty ratio of the PWM signal, from the voltage command value. The CPU 10 notifies the ASIC 2 of the on/off timing via the communication port 15. The on/off timing is an example of the result of the arithmetic processing. The details of the arithmetic processing will be described later.

The ASIC 2 is an example of a drive circuit, and has a monitoring unit 20, an arithmetic unit 21, and an output unit 22. The output unit 22 executes drive processing of each of the motors 50, 51 based on the result of the arithmetic processing of the CPU 10. The output unit 22 receives notification of the on/off timing from the CPU 10 via the communication port 15. The output unit 22 generates the PWM signals in accordance with the on/off timing and outputs the PWM signals to the inverter circuits 40, 41.

The monitoring unit 20 receives notification regarding the normality of the CPU 10 from the ECU 3. The ECU 3 monitors whether or not the CPU 10 is normally operated. For example, when the CPU 10 is normally operated, the monitoring unit 20 generates a pulse signal having a predetermined frequency from a clock signal received from an oscillator (not shown) as an input and transmits the pulse signal to the ECU 3. The ECU 3 determines the normality of the pulse signal received from the CPU 10. When the ECU 3 detects, for example, a stop of the pulse signal or the abnormality in the frequency of the pulse signal, the ECU 3 determines that abnormality has occurred in the CPU 10.

The monitoring unit 20 determines whether or not abnormality has occurred in the CPU 10, based on the notification. When the monitoring unit 20 determines that abnormality has occurred in the CPU 10, the monitoring unit 20 instructs the arithmetic unit 21 and the output unit 22 to perform the fail-safe operation.

When the arithmetic unit 21 receives the instruction on the fail-safe operation from the monitoring unit 20, the arithmetic unit 21 executes the above-described arithmetic processing of the CPU 10 on behalf of the CPU 10. In this case, the arithmetic unit 21 acquires the vehicle type parameter 130 and the characteristic map data 140 from the memories 13, 14, respectively. At this time, the arithmetic unit 21 accesses the memories 13, 14 via the communication port 15 and reads out the vehicle type parameter 130 and the characteristic map data 140 from the memories 13, 14, respectively. Further, the arithmetic unit 21 acquires the current value of each phase of the three-phase alternating current from the current sensors 60, 61.

The arithmetic unit 21 executes the arithmetic processing related to the drive control corresponding to the vehicle type of the vehicle on which the motor control device 90 is mounted in the same manner as the CPU 10 as normal, based on the vehicle type parameter 130 acquired from the memory 13 and the characteristic map data 140 acquired from the memory 14.

The output unit 22 receives notification of the on/off timing from the arithmetic unit 21 on behalf of the CPU 10. The output unit 22 generates the PWM signals in accordance with the on/off timing and outputs the PWM signals to the inverter circuits 40, 41, as in a case where the CPU 10 is normal. With this, a fail-safe function when abnormality has occurred in the CPU 10 is realized.

In the present example, the memories 13, 14 are provided inside the microcontroller 1, but may be provided outside the microcontroller 1 and the ASIC 2. In this case, the CPU 10 and the ASIC 2 can access the memories 13, 14 via, for example, a separate bus. Further, the vehicle type parameter 130 and the characteristic map data 140 may be stored on a common non-volatile memory. In this case, the storage area of the characteristic map data 140 and the storage area of the vehicle type parameter 130 in the memory are examples of the first and second storage units, respectively.

Examples of Vehicle Type Parameter and Characteristic Map Data

Next, the vehicle type parameter 130 and the characteristic map data 140 will be described. The rotation speed-torque map data and the torque-current map data suitable for the drive control of the motors 50, 51 differ depending on the specification of each vehicle type. Therefore, the CPU 10 and the arithmetic unit 21 acquire the rotation speed-torque map data and the torque-current map data corresponding to the vehicle type of the vehicle on which the motor control device 90 is mounted from the characteristic map data 140, based on the vehicle type parameter 130, and use the acquired map data for the arithmetic processing. The rotation speed-torque map data and the torque-current map data when the vehicle type parameter 130 is the reduction ratio of the differential gear 52 will be described below as examples.

Figure 2:
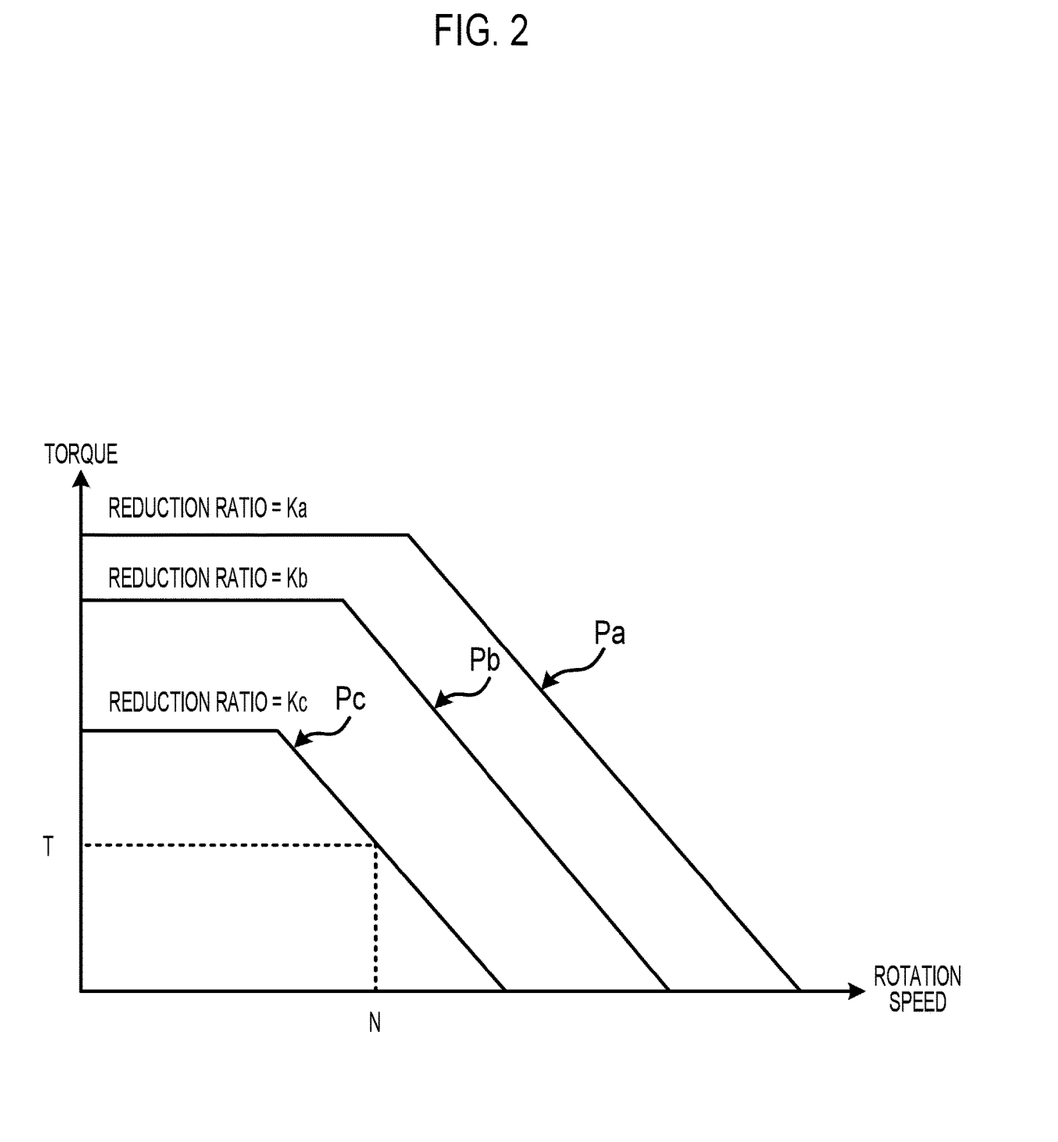
FIG. 2 is a diagram showing an example of rotation speed-torque map data corresponding to a plurality of reduction ratios of a differential gear, the reduction ratios being different from each other for each vehicle type.

FIG. 2 is a diagram showing an example of rotation speed-torque map data Pa, Pb, Pc that correspond to a plurality of reduction ratios Ka, Kb, Kc of the differential gear 52, respectively, the reduction ratios being different from each other for each vehicle type. The rotation speed-torque map data Pa, Pb, Pc indicate the correlation between the rotation speed and the torque of the motors 50, 51. The rotation speed-torque map data Pa, Pb, Pc may be different from each other for each of the motors 50, 51 or may be common for the motors 50, 51.

For example, the rotation speed-torque map data Pa, Pb, Pc have a similar relationship with each other in accordance with the ratios of the reduction ratios Ka, Kb, Kc to each other. For a certain rotation speed, out of the rotation speed-torque map data Pa, Pb, Pc, the rotation speed-torque map data Pa corresponding to the reduction ratio Ka shows the highest torque, and the rotation speed-torque map data Pc corresponding to the reduction ratio Kc shows the lowest torque.

The CPU 10 and the arithmetic unit 21 use the rotation speed-torque map data Pa, Pb, Pc corresponding to a reduction ratio indicated by the vehicle type parameter 130, out of the reduction ratios Ka, Kb, Kc, for the arithmetic processing. As an example, when the vehicle type parameter 130 indicates the reduction ratio Kc, the CPU 10 and the arithmetic unit 21 use the rotation speed-torque map data Pc corresponding to the reduction ratio Kc for the arithmetic processing. In this case, when the rotation speed satisfying the requested driving force of which the ECU 3 has notified the CPU 10 and the arithmetic unit 21 is N, the CPU 10 and the arithmetic unit 21 calculate requested torque T corresponding to the rotation speed N from the rotation speed-torque map data Pc.

Figure 3:
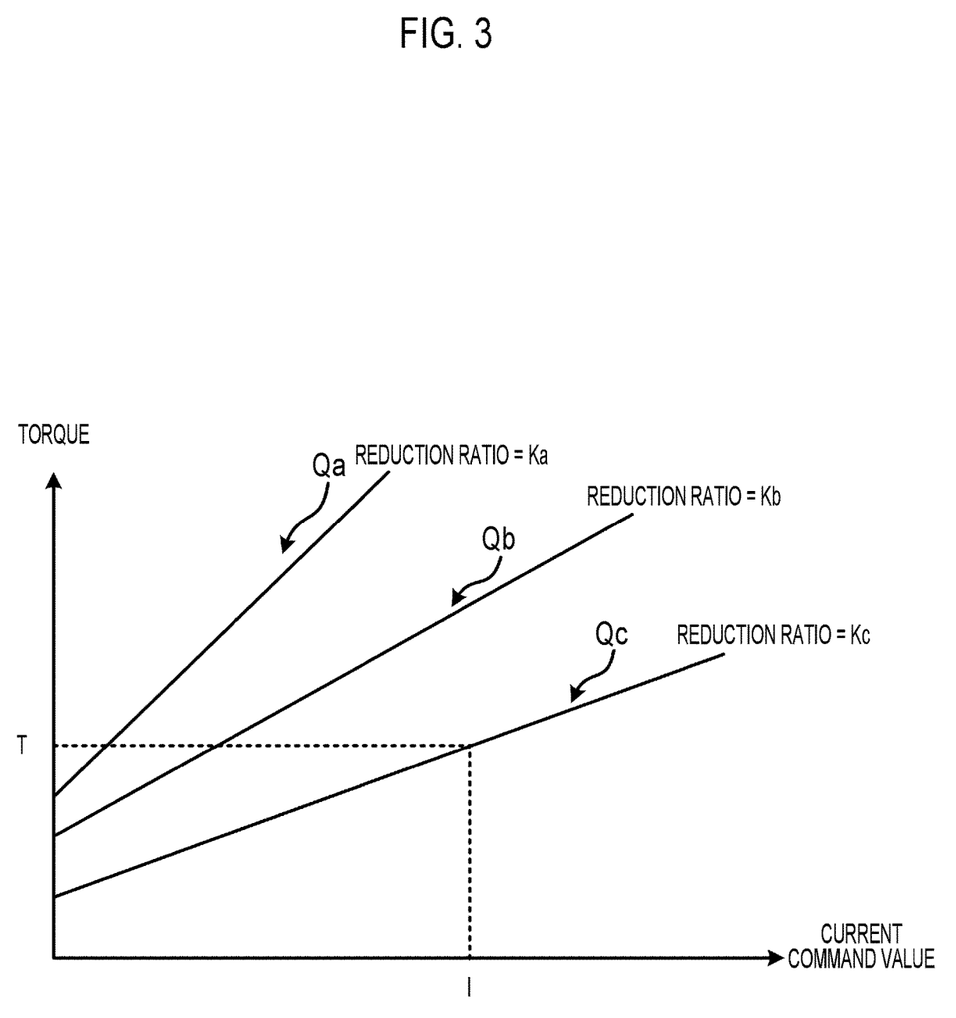
FIG. 3 is a diagram showing an example of torque-current map data corresponding to the reduction ratios of the differential gear, the reduction ratios being different from each other for each vehicle type.

FIG. 3 is a diagram showing an example of torque-current map data Qa, Qb, Qc corresponding to the reduction ratios Ka, Kb, Kc of the differential gear 52, respectively, the reduction ratios being different from each other for each vehicle type. The torque-current map data Qa, Qb, Qc indicate the correlation between the current command values of the motors 50, 51 and the requested torque. The torque-current map data Qa, Qb, Qc may be different from each other for each of the motors 50, 51, or may be common for the motors 50, 51.

For example, the torque-current map data Qa, Qb, Qc have a similar relationship with each other in accordance with the ratios of the reduction ratios Ka, Kb, Kc to each other. For a certain requested torque, out of the torque-current map data Qa, Qb, Qc, the torque-current map data Qc corresponding to the reduction ratio Kc shows the highest current command value, and the torque-current map data Qa corresponding to the reduction ratio Ka shows the lowest current command value.

The CPU 10 and the arithmetic unit 21 use the torque-current map data Qa, Qb, Qc corresponding to a reduction ratio indicated by the vehicle type parameter 130, out of the reduction ratios Ka, Kb, Kc, for the arithmetic processing. As an example, when the vehicle type parameter 130 indicates the reduction ratio Kc, the CPU 10 and the arithmetic unit 21 use the torque-current map data Qc corresponding to the reduction ratio Kc for the arithmetic processing. In this case, when the requested torque is T, the CPU 10 and the arithmetic unit 21 calculate a current command value I corresponding to the requested torque T from the torque-current map data Qc.

Next, a method of acquiring rotation speed-torque map data and torque-current map data corresponding to the vehicle type of the vehicle on which the motor control device 90 is mounted will be described.

Figure 4:
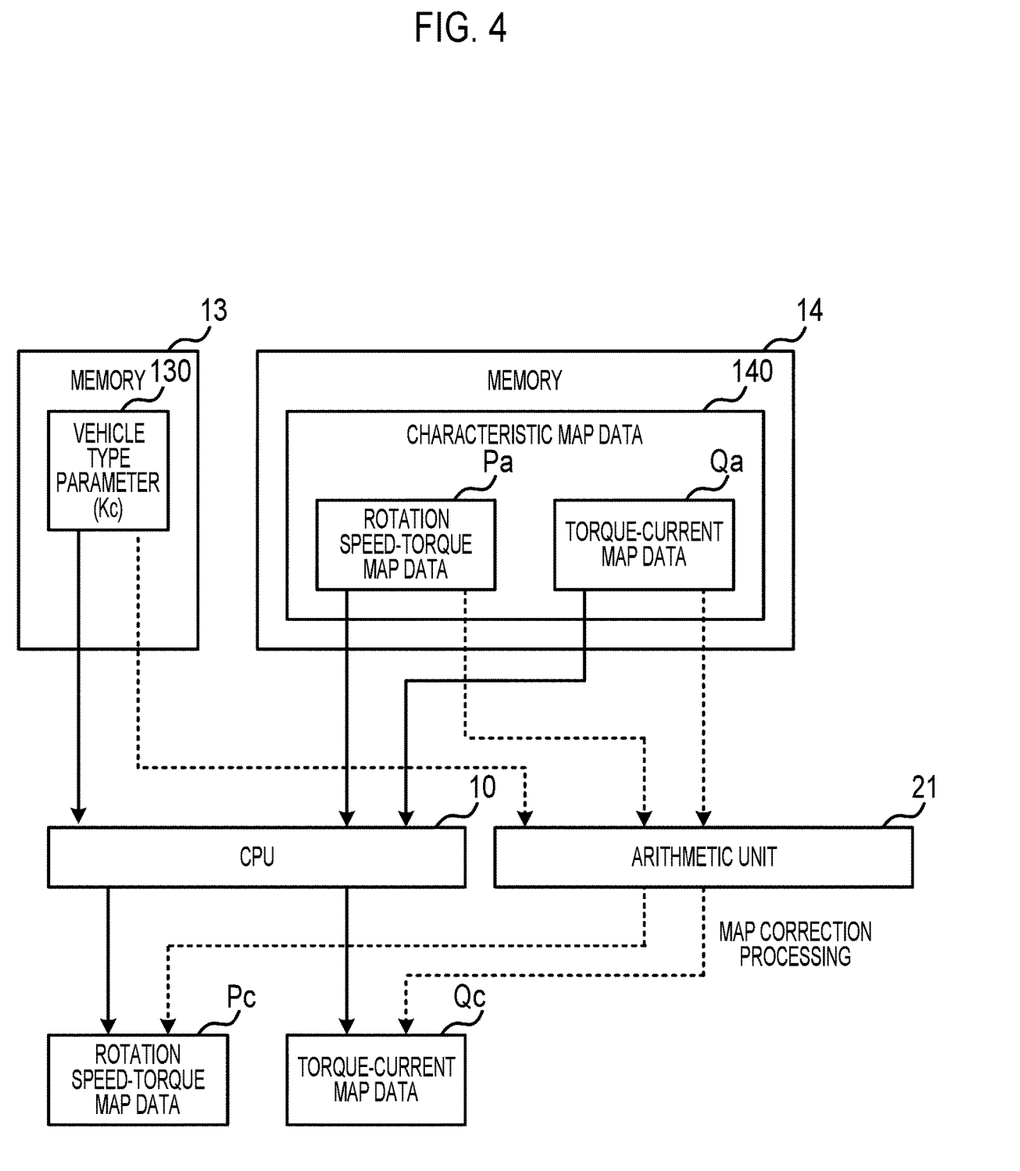
FIG. 4 is a diagram showing an example of a method of acquiring rotation speed-torque map data and torque-current map data corresponding to the vehicle type of a vehicle on which the motor control device is mounted.

FIG. 4 is a diagram showing an example of the method of acquiring the rotation speed-torque map data Pc and the torque-current map data Qc corresponding to the vehicle type of the vehicle on which the motor control device 90 is mounted. In the present example, it is assumed that the motor control device 90 is mounted on a vehicle of the vehicle type of the reduction ratio Kc. Therefore, the memory 13 stores, for example, the reduction ratio Kc as the vehicle type parameter 130 related to the vehicle type of the vehicle on which the motor control device 90 is mounted.

Further, the characteristic map data 140 stored on the memory 14 includes solely the rotation speed-torque map data Pa corresponding to the reduction ratio Ka, out of the rotation speed-torque map data Pa, Pb, Pc, and includes solely the torque-current map data Qa corresponding to the reduction ratio Ka, out of the torque-current map data Qa, Qb, Qc. That is, the memory 14 stores the torque-current map data Qa corresponding to the other vehicle type different from the vehicle type of the vehicle on which the motor control device 90 is mounted.

If the CPU 10 and the arithmetic unit 21 use the rotation speed-torque map data Pa and the torque-current map data Qa for the arithmetic processing, the motors 50, 51 cannot be normally driven and controlled because the rotation speed-torque map data Pa and the torque-current map data Qa are not suitable for the characteristics of the vehicle type of the vehicle on which the motor control device 90 is mounted. As a result, the fail-safe function cannot be appropriately realized.

For this reason, the CPU 10 and the arithmetic unit 21 acquire the reduction ratio Kc and the rotation speed-torque map data Pa from the memories 13, 14, respectively, and correct the rotation speed-torque map data Pa based on reduction ratio Kc to acquire the rotation speed-torque map data Pc corresponding to the reduction ratio Kc. For example, the CPU 10 and the arithmetic unit 21 multiply the rotation speed of the rotation speed-torque map data Pa by a constant based on the ratio of the reduction ratio Ka to the reduction ratio Kc, to obtain the rotation speed-torque map data Pc corresponding to the reduction ratio Kc. Here, the CPU 10 and the arithmetic unit 21 hold the reduction ratio Ka corresponding to the rotation speed-torque map data Pa in advance as a fixed value.

Further, the CPU 10 and the arithmetic unit 21 acquire the torque-current map data Qa from the memory 14, and correct the torque-current map data Qa based on the reduction ratio Kc to acquire the torque-current map data Qc corresponding to the reduction ratio Kc. For example, the CPU 10 and the arithmetic unit 21 multiply the current command value of the torque-current map data Qa by a constant based on the ratio of the reduction ratio Ka to the reduction ratio Kc, to obtain the torque-current map data Qc corresponding to the reduction ratio Kc.

In this way, the CPU 10 and the arithmetic unit 21 correct the rotation speed-torque map data Pa and the torque-current map data Qa such that the rotation speed-torque map data Pa and the torque-current map data Qa correspond to the vehicle type of the vehicle on which the motor control device 90 is mounted, based on the vehicle type parameter 130, and use the corrected map data for the arithmetic processing.

Figure 5:
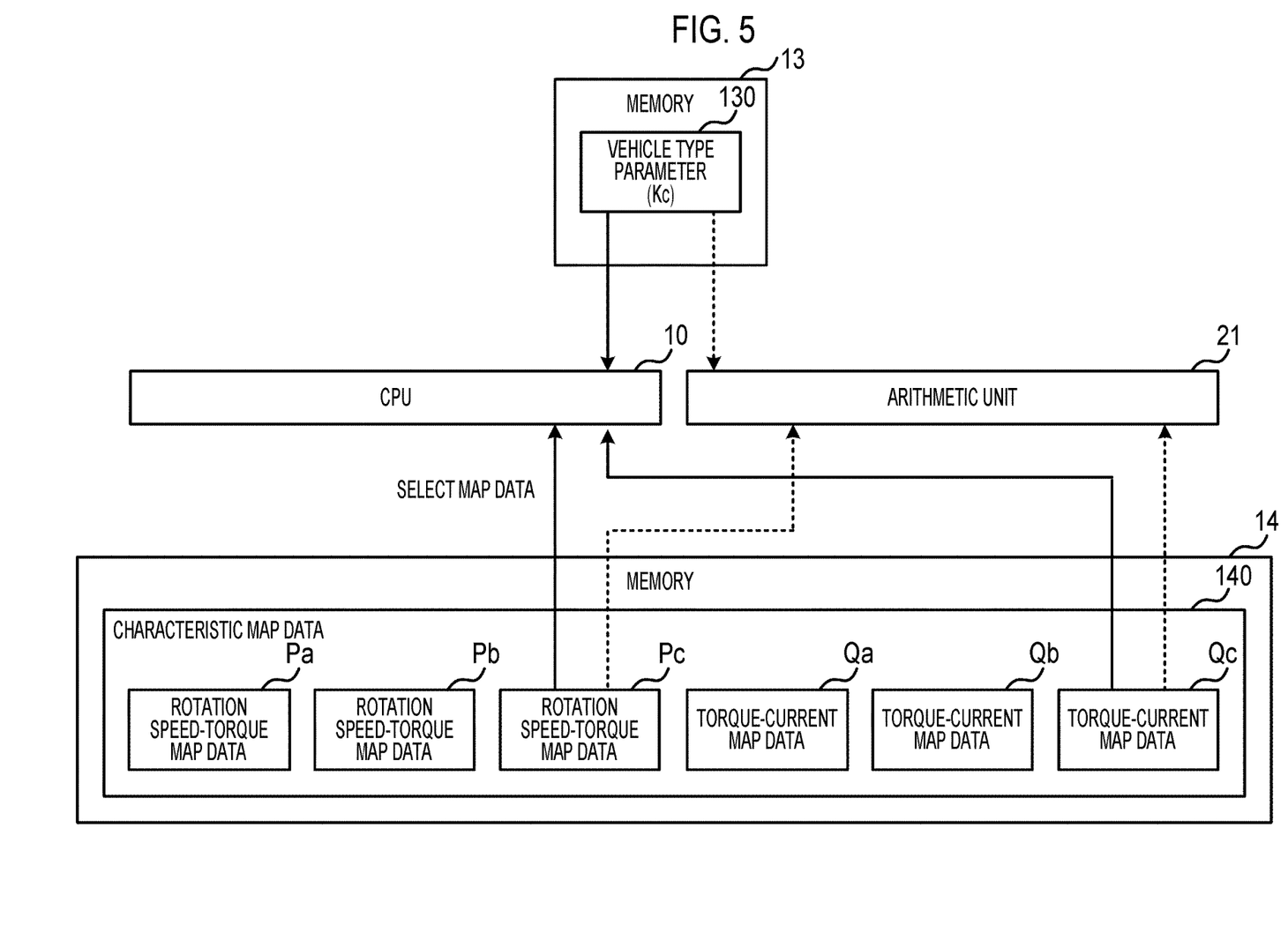
FIG. 5 is a diagram showing another example of the method of acquiring rotation speed-torque map data and torque-current map data.

FIG. 5 is a diagram showing another example of the method of acquiring the rotation speed-torque map data Pa, Pb, Pc and the torque-current map data Qa, Qb, Qc. In the present example, it is assumed that the motor control device 90 is mounted on a vehicle of the vehicle type of the reduction ratio Kc. Therefore, the memory 13 stores, for example, the reduction ratio Kc as the vehicle type parameter 130 related to the vehicle type of the vehicle on which the motor control device 90 is mounted.

Further, the characteristic map data 140 stored on the memory 14 includes the rotation speed-torque map data Pa, Pb, Pc and the torque-current map data Qa, Qb, Qc corresponding to the reduction ratios Ka, Kb, Kc related to a plurality of vehicle types, respectively. The characteristic map data 140 also includes the rotation speed-torque map data Pa, Pb and the torque-current map data Qa, Qb other than the vehicle type of the vehicle on which the motor control device 90 is mounted. That is, the memory 14 stores the characteristic map data 140 corresponding to the plurality of vehicle types.

The CPU 10 and the arithmetic unit 21 acquire the reduction ratio Kc from the memory 13. The CPU 10 and the arithmetic unit 21 select and acquire solely the rotation speed-torque map data Pc corresponding to the reduction ratio Kc out of the rotation speed-torque map data Pa, Pb, Pc stored on the memory 14. Specifically, the CPU 10 and the ASIC 2 read out the rotation speed-torque map data Pc from, for example, the storage area corresponding to the reduction ratio Kc out of the storage areas of the memory 14.

Further, the CPU 10 and the arithmetic unit 21 select and acquire solely the torque-current map data Qc corresponding to the reduction ratio Kc out of the torque-current map data Qa, Qb, Qc stored on the memory 14. Specifically, the CPU 10 and the arithmetic unit 21 read out the torque-current map data Qc from, for example, the storage area corresponding to the reduction ratio Kc out of the storage areas of the memory 14.

As described above, the CPU 10 and the arithmetic unit 21 read out, from the memory 14, the rotation speed-torque map data Pc and the torque-current map data Qc corresponding to the vehicle type of the vehicle on which the motor control device 90 is mounted, out of the plurality of vehicle types, based on the vehicle type parameter 130 and use the read-out map data for the arithmetic processing.

In this way, the CPU 10 and the arithmetic unit 21 can acquire the rotation speed-torque map data Pc and the torque-current map data Qc corresponding to the reduction ratio Kc of the vehicle type of the vehicle on which the motor control device 90 is mounted. Therefore, the CPU 10 and the arithmetic unit 21 can calculate an appropriate requested torque and current command value corresponding to the reduction ratio Kc.

Further, in the case of the example of FIG. 4, the capacity of the memory 14 can be reduced because the amount of data of the characteristic map data 140 stored on the memory 14 is smaller than the amount of data in the case of the example of FIG. 5. On the other hand, in the case of the example of FIG. 5 unlike the case of the example of FIG. 4, it is unnecessary for the CPU 10 and the arithmetic unit 21 to perform the correction processing of the rotation speed-torque map data Pa and the torque-current map data Qa, so that the load of the arithmetic processing can be reduced.

Operation Example of Motor Control Device

Figure 6:
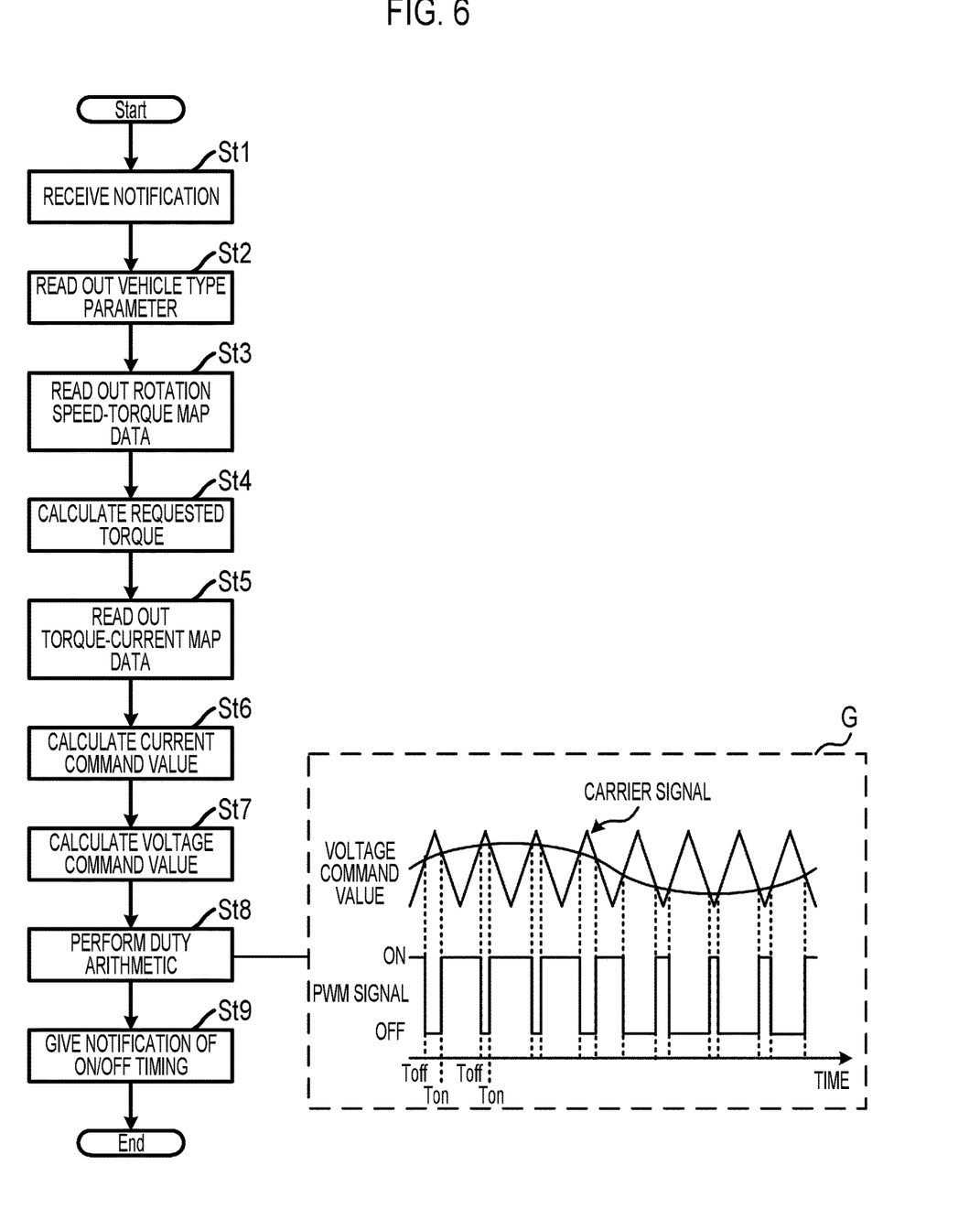
FIG. 6 is a flowchart showing an example of operation of a CPU.

FIG. 6 is a flowchart showing an example of the operation of the CPU 10. Steps St2 to St8 described below are examples of the arithmetic processing related to the drive control of the motors 50, 51 corresponding to the vehicle type of the vehicle on which the motor control device 90 is mounted.

The CPU 10 receives notification of the requested driving force from the ECU 3 (step St1). Next, the CPU 10 acquires the vehicle type parameter 130 from the memory 13 (step St2).

Next, the CPU 10 first reads out the rotation speed-torque map data, out of the characteristic map data 140, from the memory 14 (step St3). Next, the CPU 10 calculates the requested torque corresponding to the rotation speed of the motors 50, 51 satisfying the requested driving force, from the vehicle type parameter 130 and the rotation speed-torque map data (step St4).

At this time, the CPU 10 acquires, based on the vehicle type parameter 130, the rotation speed-torque map data corresponding to the vehicle type of the vehicle on which the motor control device 90 is mounted, in accordance with the acquisition method described with reference to FIG. 4 or 5. The CPU 10 obtains the requested torque corresponding to the rotation speed of the motors 50, 51 from the rotation speed-torque map data corresponding to the vehicle type of the vehicle on which the motor control device 90 is mounted.

Next, the CPU 10 reads out the torque-current map data, out of the characteristic map data 140, from the memory 14 (step St5). Next, the CPU 10 calculates the current command value of three-phase alternating current satisfying the requested torque, from the vehicle type parameter 130 and the torque-current map data (step St6).

At this time, the CPU 10 acquires, based on the vehicle type parameter 130, the torque-current map data corresponding to the vehicle type of the vehicle on which the motor control device 90 is mounted, in accordance with the acquisition method described with reference to FIG. 4 or 5. Further, the CPU 10 obtains the current command value of three-phase alternating current satisfying the requested torque, from the torque-current map data corresponding to the vehicle type of the vehicle on which the motor control device 90 is mounted.

Next, the CPU 10 calculates the voltage command values of the motors 50, 51 from the current command values (step St7). At this time, the CPU 10 acquires the current value of the three-phase alternating current from the current sensors 60, 61 via the HW-INF 16. The CPU 10 decides the current command value by PI control, for example, in accordance with the difference between the current command value and the current value of the current sensor.

Next, the CPU 10 performs duty arithmetic of the PWM signal from the voltage command value (step St8). At this time, as indicated by the reference numeral Q the CPU 10 generates a carrier signal that changes in a triangular wave shape on the time axis, and compares the voltage command value that changes in a sine wave shape with the signal value of the carrier signal. The carrier signal is a signal that is used to decide the on/off timing of the PWM signal. The PWM signal is turned off when the signal value of the carrier signal is the voltage command value or more, and the PWM signal is turned on when the signal value of the carrier signal is less than the voltage command value. The CPU 10 calculates time Ton when the PWM signal is turned on and time Toff when the PWM signal is turned off. The duty ratio of the PWM signal is decided by time Ton and Toff.

In this way, the CPU 10 executes arithmetic processing related to the drive control of the motors 50, 51 corresponding to the vehicle type of the vehicle on which the motor control device 90 is mounted, based on the vehicle type parameter 130 and the characteristic map data 140.

Next, the CPU 10 notifies the output unit 22 of the ASIC 2, via the communication port 15, of the on/off timing as a result of the arithmetic processing, that is, time Ton and Toff (step St9). In this way, the CPU 10 is operated.

Figure 7:
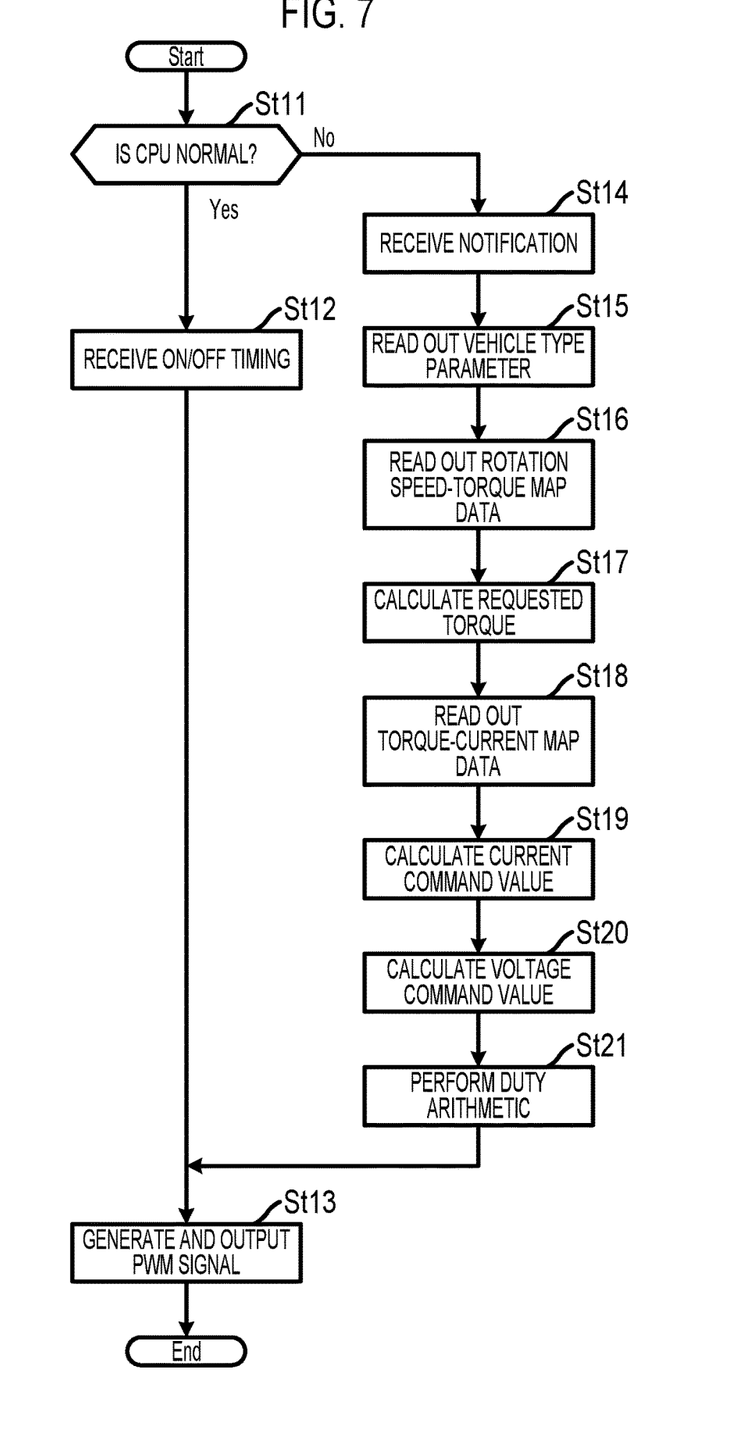
FIG. 7 is a flowchart showing an example of operation of an ASIC.

FIG. 7 is a flowchart showing an example of the operation of the ASIC 2. Steps St15 to St21 described below are examples of the arithmetic processing related to the drive control of the motors 50, 51 corresponding to the vehicle type of the vehicle on which the motor control device 90 is mounted. Further, step St13 described below is an example of the drive processing of the motors 50, 51 of the vehicle on which the motor control device 90 is mounted.

The monitoring unit 20 of the ASIC 2 determines whether or not the operation of the CPU 10 is normal, based on the notification from the ECU 3 (step St11). The monitoring unit 20 may directly determine the normality of the CPU 10 by communicating with the CPU 10, without going through the ECU 3.

When the operation of the CPU 10 is normal (Yes in step St11), the output unit 22 receives notification of the on/off timing from the CPU 10 (step St12). Next, the output unit 22 generates the PWM signals (see reference numeral G in FIG. 6) based on the on/off timing and outputs the PWM signals to the inverter circuits 40, 41 (step St13). As described above, when the operation of the CPU 10 is normal, the ASIC 2 executes generation processing and output processing of the PWM signal based on the result of the arithmetic processing of the CPU 10 regardless of the type of vehicle, out of the control for the motors 50, 51.

Alternatively, when the operation of the CPU 10 is abnormal (No in step St11), the ASIC 2 performs the arithmetic processing of following steps St14 to St21 on behalf of the CPU 10, in order to realize the fail-safe function.

The arithmetic unit 21 receives notification of the requested driving force from the ECU 3 (step St14). Next, the ASIC 2 acquires the vehicle type parameter 130 from the memory 13 (step St15).

Next, the arithmetic unit 21 first reads out the rotation speed-torque map data, out of the characteristic map data 140, from the memory 14 (step St16). Next, the arithmetic unit 21 calculates the requested torque corresponding to the rotation speed of the motors 50, 51 satisfying the requested driving force, from the vehicle type parameter 130 and the rotation speed-torque map data (step St17).

At this time, the arithmetic unit 21 acquires, based on the vehicle type parameter 130, the rotation speed-torque map data corresponding to the vehicle type of the vehicle on which the motor control device 90 is mounted, in accordance with the acquisition method described with reference to FIG. 4 or 5. Further, the arithmetic unit 21 obtains the requested torque corresponding to the rotation speed of the motors 50, 51 from the rotation speed-torque map data corresponding to the vehicle type of the vehicle on which the motor control device 90 is mounted.

Next, the arithmetic unit 21 reads out the torque-current map data, out of the characteristic map data 140, from the memory 14 (step St18). Next, the arithmetic unit 21 calculates the current command value of the three-phase alternating current satisfying the requested torque, from the vehicle type parameter 130 and the torque-current map data (step St19).

At this time, the arithmetic unit 21 acquires, based on the vehicle type parameter 130, the torque-current map data corresponding to the vehicle type of the vehicle on which the motor control device 90 is mounted, in accordance with the acquisition method described with reference to FIG. 4 or 5. Further, the arithmetic unit 21 obtains the current command value of three-phase alternating current satisfying the requested torque, from the torque-current map data corresponding to the vehicle type of the vehicle on which the motor control device 90 is mounted.

Next, the arithmetic unit 21 calculates the voltage command values of the motors 50, 51 from the current command values (step St20). At this time, the arithmetic unit 21 acquires the current values of the three-phase alternating current from the current sensors 60, 61. The arithmetic unit 21 decides the current command value by PI control, for example, in accordance with the difference between the current command value and the current value of the current sensor.

Next, the arithmetic unit 21 performs duty arithmetic of the PWM signal from the voltage command value (step St21). At this time, as described with reference to the reference numeral G in FIG. 6, the arithmetic unit 21 compares the signal value of the carrier signal with the voltage command value to calculate time Ton when the PWM signal is turned on and time Toff when the PWM signal is turned off, as the on/off timing.

Next, the arithmetic unit 21 generates the PWM signals based on the on/off timing and outputs the PWM signals to the inverter circuits 40, 41 (step St13).

As described above, when the operation of the CPU 10 is abnormal, the ASIC 2 execute the arithmetic processing corresponding to the type of the vehicle on which the motor control device 90 is mounted based on the vehicle type parameter 130 and the characteristic map data 140 that are read out from the memories 13, 14, respectively.

Therefore, with the fail-safe operation of the ASIC 2, the motor control device 90 can continue the drive control of the motors 50, 51 corresponding to the characteristics of the vehicle type of the vehicle on which the motor control device 90 is mounted, even when abnormality has occurred in the CPU 10. Further, since the memories 13, 14 are provided outside the ASIC 2, an increase in device cost is restrained. Accordingly, the motor control device 90 can restrain the increase in device cost and appropriately realize the fail-safe function in response to the vehicle type.

The embodiments described above are examples of preferred embodiments of the present invention. Note that the present invention is not limited to the embodiments and various modifications can be made without departing from the gist of the present invention.

What is claimed is:

1. A motor control device comprising:
   a first storage unit configured to store characteristic data related to drive control of a motor of a plurality of vehicle types;
   a second storage unit configured to store a vehicle type parameter related to a predetermined vehicle type, wherein the vehicle type parameter is a reduction ratio of a differential gear connected to the motor;
   a processor configured to execute arithmetic processing related to the drive control corresponding to the predetermined vehicle type, based on the vehicle type parameter and the characteristic data; and
   a drive circuit configured to execute drive processing of a motor of a vehicle of the predetermined vehicle type, based on a result of the arithmetic processing,
   wherein the drive circuit is configured to read out the characteristic data from the first storage unit and the vehicle type parameter from the second storage unit when abnormality has occurred in the processor, and to execute the arithmetic processing related to the drive control corresponding to the predetermined vehicle type, based on the vehicle type parameter and the characteristic data.

2. The motor control device according to claim 1, wherein:
   the first storage unit is configured to store the characteristic data corresponding to the other vehicle type different from the predetermined vehicle type; and
   the drive circuit is configured to correct the characteristic data such that the characteristic data corresponds to the predetermined vehicle type, based on the vehicle type parameter, when abnormality has occurred in the processor and to use the corrected characteristic data for the arithmetic processing.

3. The motor control device according to claim 1, wherein:
   the drive circuit is configured to read out, from the first storage unit, the characteristic data corresponding to the predetermined vehicle type out of the plurality of vehicle types based on the vehicle type parameter, and to use the characteristic data for the arithmetic processing.

4. The motor control device according to claim 1, wherein the characteristic data includes a correlation between rotation speed and torque of the motor.

5. The motor control device according to claim 1, wherein the characteristic data includes a correlation between torque and a current value of the motor.

6. The motor control device according to claim 1, wherein the drive circuit is configured to receive notification regarding normality of the processor, and the drive circuit is configured to determine whether or not abnormality has occurred in the processor, based on the notification.

7. A motor control method comprising:
   determining, by a drive circuit, whether or not abnormality has occurred in a processor configured to execute arithmetic processing related to drive control corresponding to a predetermined vehicle type, based on a vehicle type parameter related to drive control of a motor of a vehicle and characteristic data related to the predetermined vehicle type, wherein the vehicle type parameter is a reduction ratio of a differential gear connected to the motor;

reading out, by the drive circuit, the characteristic data from a first storage unit configured to store the characteristic data for a plurality of vehicle types and the vehicle type parameter from a second storage unit configured to store the vehicle type parameter when the drive circuit determines that abnormality has occurred in the processor; and executing, by the drive circuit, the arithmetic processing related to the drive control corresponding to the predetermined vehicle type, based on the vehicle type parameter and the characteristic data.

* * * * *